US007922581B2

(12) United States Patent
Potts

(10) Patent No.: US 7,922,581 B2
(45) Date of Patent: Apr. 12, 2011

(54) SYSTEM AND METHOD FOR PERFORMING A FINANCIAL TRANSACTION IN AN ENTERTAINMENT CENTER

(75) Inventor: Craig K. Potts, Henderson, NV (US)

(73) Assignee: Global Cash Access, Inc., Las Vegas, NV (US)

( * ) Notice: Subject to any disclaimer, the term of this patent is extended or adjusted under 35 U.S.C. 154(b) by 555 days.

(21) Appl. No.: 11/261,974

(22) Filed: Oct. 28, 2005

(65) Prior Publication Data

US 2006/0160610 A1 Jul. 20, 2006

Related U.S. Application Data

(60) Provisional application No. 60/623,597, filed on Oct. 29, 2004.

(51) Int. Cl.
*G06F 19/00* (2011.01)

(52) U.S. Cl. ............................................ 463/29; 463/25

(58) Field of Classification Search .............. 463/16–19, 463/25, 29
See application file for complete search history.

(56) References Cited

U.S. PATENT DOCUMENTS 4,689,742 A 8/1987 Troy et al.
4,764,666 A 8/1988 Bergeron
4,882,473 A 11/1989 Bergeron et al.
5,038,022 A 8/1991 Lucero
5,179,517 A 1/1993 Sarbin et al.
5,265,874 A 11/1993 Dickinson et al.
5,321,241 A 6/1994 Craine
5,429,361 A 7/1995 Raven et al.
5,457,306 A 10/1995 Lucero
5,470,079 A 11/1995 Lestrange et al.
5,613,912 A 3/1997 Slater
5,642,160 A 6/1997 Bennett
5,663,546 A 9/1997 Cucinotta et al.
5,679,938 A 10/1997 Templeton et al.

(Continued)

FOREIGN PATENT DOCUMENTS

EP 1 107 196 6/2001

(Continued)

OTHER PUBLICATIONS

AAMVA National Standard for the Driver License/Identification Card, Jun. 30, 2000, pp. 1-90.

(Continued)

*Primary Examiner* — David L Lewis
*Assistant Examiner* — Eric M Thomas
(74) *Attorney, Agent, or Firm* — Oppenheimer Wolff & Donnelly LLP

(57) ABSTRACT

The present disclosure relates to a distribution system for providing cash or other items of value to a user at the location of the gaming system and a method for using the distribution system. The disclosure relates to a distribution system for use with an entertainment station. The distribution system includes a remote control unit accessible from the entertainment station and operably coupled to a base processor. The remote control unit is adapted to receive user account information and a requested transaction type from a group consisting of deposit, transfer, and withdrawal. The remote control unit is also adapted to provide a signal to the base processor, and the base processor is adapted to receive the signal from the remote control unit and to process the requested transaction type based on the account information. The base processor is adapted to distribute cash or cash equivalent to a user.

24 Claims, 6 Drawing Sheets

U.S. PATENT DOCUMENTS 5,741,183 A 4/1998 Acres et al.
5,754,655 A 5/1998 Hughes et al.
5,766,075 A 6/1998 Cook et al.
5,770,533 A * 6/1998 Franchi ........................... 463/42
5,813,912 A 9/1998 Shultz
5,864,623 A 1/1999 Messina et al.
5,902,983 A 5/1999 Crevelt et al.
5,919,091 A 7/1999 Bell
5,959,277 A 9/1999 Lucero et al.
5,991,410 A 11/1999 Albert et al.
5,999,624 A 12/1999 Hopkins
6,001,016 A 12/1999 Walker et al.
6,044,360 A 3/2000 Picciallo
6,048,269 A 4/2000 Burns et al.
6,048,271 A 4/2000 Barcelou
6,064,987 A 5/2000 Walker et al.
6,124,947 A 9/2000 Seo
6,162,122 A 12/2000 Acres et al.
6,168,522 B1 1/2001 Walker et al.
6,244,958 B1 6/2001 Acres
6,275,991 B1 8/2001 Erlin
6,293,866 B1 9/2001 Walker et al.
6,302,793 B1 10/2001 Fertitta, III et al.
6,347,738 B1 2/2002 Crevelt et al.
6,352,205 B1 3/2002 Mullins et al.
6,361,437 B1 3/2002 Walker et al.
6,409,595 B1 6/2002 Uihlein et al.
6,431,983 B2 8/2002 Acres
RE37,885 E 10/2002 Acres et al.
6,486,768 B1 11/2002 French et al.
6,487,284 B1 11/2002 Campbell
6,505,772 B1 1/2003 Mollett et al.
6,547,131 B1 4/2003 Foodman et al.
6,575,832 B1 6/2003 Manfredi et al.
6,577,733 B1 6/2003 Charrin et al.
6,579,179 B2 6/2003 Poole et al.
6,585,598 B2 7/2003 Nguyen et al.
6,601,040 B1 7/2003 Kolls
6,607,441 B1 8/2003 Acres
6,628,939 B2 * 9/2003 Paulsen ...................... 455/414.1
6,675,152 B1 1/2004 Prasad et al.
6,682,421 B1 1/2004 Rowe et al.
6,709,333 B1 3/2004 Bradford et al.
6,851,607 B2 2/2005 Orus et al.
6,852,031 B1 2/2005 Rowe
6,951,302 B2 10/2005 Potts
6,997,807 B2 2/2006 Weiss
7,003,496 B2 2/2006 Ishii et al.
7,094,149 B2 8/2006 Walker et al.
7,311,605 B2 12/2007 Moser
2001/0022849 A1 9/2001 Simonoff
2001/0044337 A1 * 11/2001 Rowe et al. ..................... 463/29
2001/0050311 A1 12/2001 Avellino
2002/0002075 A1 1/2002 Rowe
2002/0039921 A1 4/2002 Rowe et al.
2002/0039923 A1 4/2002 Cannon et al.
2002/0045476 A1 4/2002 Poole
2002/0068624 A1 6/2002 Ellis
2002/0077178 A1 * 6/2002 Oberberger et al. ............ 463/42
2002/0103027 A1 * 8/2002 Rowe et al. ..................... 463/39
2002/0116615 A1 * 8/2002 Nguyen et al. ................ 713/168
2002/0132664 A1 9/2002 Miller et al.
2002/0147047 A1 * 10/2002 Letovsky et al. ............... 463/42
2002/0177479 A1 * 11/2002 Walker et al. ................... 463/25
2003/0033534 A1 2/2003 Rand et al.
2003/0036425 A1 2/2003 Kaminkow et al.
2003/0045353 A1 3/2003 Paulsen et al.
2003/0064805 A1 * 4/2003 Wells ............................. 463/39
2003/0078094 A1 4/2003 Gatto et al.
2003/0087692 A1 5/2003 Weiss
2003/0104865 A1 6/2003 Itkis et al.
2003/0106769 A1 6/2003 Weiss
2003/0176218 A1 9/2003 LeMay et al.
2003/0186747 A1 10/2003 Nguyen et al.
2003/0211883 A1 11/2003 Potts
2003/0222153 A1 12/2003 Pentz et al.
2003/0228902 A1 12/2003 Walker et al.
2003/0236749 A1 12/2003 Shergalis
2004/0053693 A1 3/2004 An
2004/0063494 A1 4/2004 Oram et al.
2004/0093303 A1 5/2004 Picciallo
2004/0173673 A1 9/2004 Potts
2004/0214643 A1 10/2004 Parrott et al.
2004/0229671 A1 * 11/2004 Stronach et al. .................. 463/6
2005/0009600 A1 1/2005 Rowe et al.
2005/0054417 A1 3/2005 Parrott et al.
2005/0054446 A1 3/2005 Kammier et al.
2005/0080728 A1 4/2005 Sobek
2005/0096124 A1 * 5/2005 Stronach ......................... 463/25
2006/0148559 A1 7/2006 Jordan et al.
2006/0160610 A1 7/2006 Potts
2007/0060309 A1 3/2007 Yankton et al.
2007/0066386 A1 3/2007 Shields
2007/0213124 A1 9/2007 Walker et al.

FOREIGN PATENT DOCUMENTS

GB 2 380 687 4/2003
WO WO 93/23817 11/1993
WO WO 94/16781 8/1994
WO WO 97/13228 4/1997
WO WO 01/57617 8/2001

OTHER PUBLICATIONS

Quinn, William, "Worth Their Weight in Gold," Apr. 1, 2003, pp. 24-26.
Final Office Communication of Jan. 21, 2009 for U.S. Appl. No. 10/417,639.
Office Communication of Jul. 24, 2008 for U.S. Appl. No. 10/417,639.
Office Communication of Oct. 15, 2007 for U.S. Appl. No. 10/417,639.
Advisory Communication of Jun. 8, 2007 for U.S. Appl. No. 10/417,639.
Final Office Communication of Jan. 30, 2007 for U.S. Appl. No. 10/417,639.
Office Communication of May 2, 2006 for U.S. Appl. No. 10/417,639.
American Association of Motor Vehicle Administrator (AAMVA), document entitled "AAMVA National Standard for the Driver License / Identification Card—AAMVA DL/ID-2000";90 pgs; © 2000.

* cited by examiner

SYSTEM AND METHOD FOR PERFORMING A FINANCIAL TRANSACTION IN AN ENTERTAINMENT CENTER

CROSS REFERENCE TO RELATED APPLICATIONS

This application claims the benefit of prior U.S. Application No. 60/623,597, which was filed on Oct. 29, 2004.

BACKGROUND OF THE INVENTION

The present disclosure relates to entertainment systems such as gaming systems including casino games. More particularly, the present disclosure relates to a distribution system for providing cash or other items of value to a user at the location of the gaming system.

Entertainment centers and associated costs are on the rise. As Americans age, an increasing percentage of them participate in entertainment activities. Entertainment activities include casinos, cruises, virtual reality gaming centers, theme parks, and other engaging activities. Each of these activities require the payment of cash or equivalent consideration in order to engage in these activities. Unfortunately, the elderly, handicapped and families with small children may often find it difficult to engage in cash withdrawal transactions as the traditional automatic teller machine (ATM) may be placed in an area that is not very accessible or difficult to reach.

Additionally, enjoyment of the casino gaming experience is often predicated upon a player's ability to easily and effectively manage his or her winnings. Typically, when a player is finished using a gaming machine, the player's winnings are redeemed either by distributing to the player the appropriate amount of cash or crediting the player's casino-specific account through a casino-issued card. When the winnings are distributed in cash, the player is left with the task of collecting and carrying cumbersome coins either to another gaming machine or to the casino cage to convert the winnings into a more manageable medium such as paper cash. The hassle of carrying coins can be annoying and lines at the cage can be inconvenient. Alternatively, when the winnings are distributed by crediting a casino-issued card, the player may avoid the burden of dealing with awkward coins, but the player is still left with the undertaking of converting the winnings into a medium that is usable outside the casino. In sum, existing redemption methods require numerous steps and other burdens.

Because casinos have an interest in maintaining a high level of customer satisfaction, it is advantageous to provide customers with the ability to easily withdrawal money for spending and effectively manage their winnings in a manner that empowers them to quickly collect their money in a form of their choosing. Therefore, there is a need for a system and method of providing direct access to a cash or cash equivalent (collectively "Cash") withdrawal system such that a player may engage in one or more entertainment activities.

BRIEF SUMMARY OF THE INVENTION

The present disclosure relates to a distribution system for providing cash or other items of value to a user at the location of the gaming system and a method for using the distribution system. In one aspect, the disclosure relates to a distribution system for use with an entertainment station. The distribution system includes a remote control unit accessible from the entertainment station and operably coupled to a base processor. The remote control unit is adapted to receive user account information and a requested transaction type from a group consisting of deposit, transfer, and withdrawal. The remote control unit is also adapted to provide a signal to the base processor, and the base processor is adapted to receive the signal from the remote control unit and to process the requested transaction type based on the account information. The base processor is also adapted to distribute cash or cash equivalent to a user.

In another aspect, the disclosure relates to a combination entertainment station including a gaming station with a gaming table or a gaming machine. The gaming station provides a game of chance to a user. The gaming station also includes a distribution system including a remote control unit and a base processor. The remote control unit is directly coupled, or built into the gaming station and is operably coupled to the base processor. Again, the base processor is adapted to distribute at least one of cash or cash equivalent to the user.

In still a further aspect, the disclosure provides a method for operating a distribution system in connection with an entertainment station and an established account. One step includes providing information related to the account and a requested transaction type to a remote control unit located proximate to the entertainment station. Another step includes sending the information related to the account and a requested transaction type to a base processor remotely located from the entertainment station. A third step includes approving the information related to the account and a requested transaction type based on at least correctly identifying the account and having funds available in the account By integrating a casino game machine, table game, video game machine virtual entertainment device or other entertainment station with the distribution system that includes these enhanced features, both national, state and local governments can exercise increased control of these devices or, in the alternative, an entertainment provider could exercise greater control over the use, distribution and negotiation of instruments that are distributed or otherwise offered with the distribution system. This enhanced management and control, when combined with easy and convenient access, provides all of the parties that may have an interest in the financial transaction (regulator, entertainment providers, the player, tour operators, spouses, or other interested parties) with the ability to more effectively manage the consumption of entertainment.

The present disclosure also provides a number of benefits to the user and the entertainment center, and a few of these many advantages are listed here. The distribution system is conveniently provided to a customer or patron by being incorporated directly into a table game, casino game machine or entertainment device. The integration of the distribution system with a table or casino game incorporate only a few or many features depending on the size of the physical unit desired and common features that are appropriate for the game to which it is being integrated. This may also vary based on attributes of the game such as the maximum permitted bet, the maximum prize, the number of players at the table, or other factors. Or, in some instances, may be based on the scope and type of negotiation zone. For example, certain transactions may only be permitted in negotiations zones that sell goods, or provide services, or are used for a particular type of entertainment.

The distribution system can also include any number of macros or "short cuts" to one or more feature combinations such that a player can jump to end of a transaction within a step or two. These macros could be selected by a player or otherwise assigned to a given identity to provide each customer with a unique set of instructions that are tailored to their needs based on location of the entertainment device, the transactions that are consistently needed in that environment, the accounts that are linked to the ID card or device (either directly or indirectly) and other factors.

The integration of entertainment devices with financial account management also provides the advantage of potentially avoiding any withdrawals at all. For example, by using distribution system, a player could get access to credits needed to play the game but following a big win would be in the position of placing money into accounts rather than withdrawing them at all. Some linked accounts could be storing winnings, for example, which could then be used to credit shortcomings in different associated accounts.

DETAILED DESCRIPTION OF THE INVENTION

This disclosure relates to a distribution system and method for providing cash or other items of value to a user at the location of the gaming system and a method for using the distribution systems. The disclosure, including the figures, describes the system, method and their components with reference to a several illustrative examples. For example, the disclosure proceeds with respect to a system having a particular remote control unit and base processor described below. However, it should be noted that the present invention could be implemented in other systems, as well. The present disclosure proceeds with respect to the system for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims The present disclosure provides both a system and method for providing direct access to Cash by incorporating a Cash distribution system into an entertainment device and system, such as a gaming station, directly, or has the Cash distribution system portable and proximate the entertainment device. The Cash distribution system can be programmed to provide a convenient array of functions or "macros" that have been arranged to provide an enhanced user interface ("UI") and simpler functionality. Additionally, the present system and method enhances the multi-function distribution system by permitting use of check-like transactions and enhancing the forms of Cash distribution mediums that may be used by the distribution system. For example, a distribution system could distribute one or more financial instruments that are not negotiable in the normal course such as bar coded tickets, cash tokens, smart cards, check-less instruments, bank cards (so called "ATM" cards), biometric identification codes, audio identification systems or other forms of financial and personal identity devices. The financial instruments could then be offered or distributed at the location of the entertainment devices.

Figure 1:
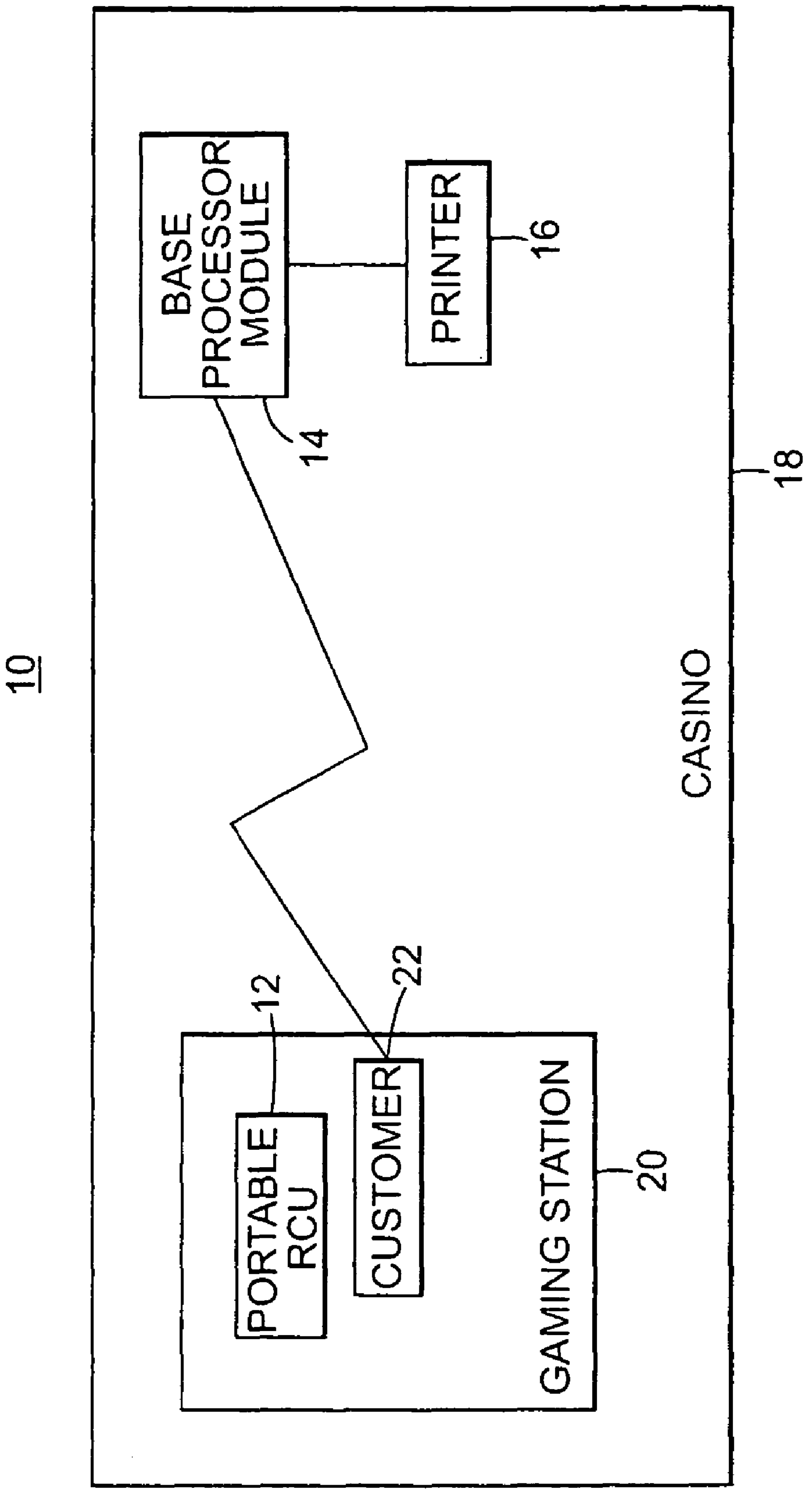
FIG. 1 is a block diagram of a casino transaction system ID accordance with an embodiment of the present invention.

One embodiment of a casino financial transaction system, or distribution system 10, is shown in block form in FIG. 1. The system 10 includes a portable remote control unit (RCU) 12, a base processor module 14, and a printer 16. In general terms the system 10 is adapted for use within a casino 18 having at least one gaming station 20. The gaming station 20 can assume a wide variety of forms, including, for example, a gaming machine (e.g., slot machine, video poker, keno terminal, etc.) or a gaming table (e.g., black jack, poker, craps, roulette, etc.). Regardless, the RCU 12 is adapted to facilitate a financial card-type transaction (e.g., credit card, bank card, debit card, etc.), and is presented to a customer 22 otherwise located at the gaming station 20. Information relating to the desired financial transaction is entered into the RCU 12 that in turn signals the information to the base processor module 14 via wireless transmission. In one preferred embodiment, a terminal transceiver (not shown) is provided for receiving the wireless transmission. The base processor module 14 is operated to obtain approval for the desired financial transaction. Upon receiving approval for the desired transaction, the customer 22 enters a signature into the RCU 12 that in turn forwards an electronic copy of the customer's signature to the base processor module 14. The base processor module 14 then operates the printer 16 to print a negotiable financial document that includes the customer's signature. A financial instrument (e.g., chips, cash, check, etc.) is presented to the customer 22 at the gaming station 20. Thus, the entire financial transaction occurs without the customer 22 ever leaving the gaming station 20.

The described systems include or are adapted to operate on a developed communications infrastructure. In the preferred embodiment, the communications channels use wireless communication networks to transmit requested and information. This includes communications protocols such as Bluetooth, 802.11, RF, ultra-wide band, RFID and other forms of wireless communications. Alternatively, the system could use any number of traditionally "wired" solutions including network cables, power cards, USB ports, keypad entry or other communications systems and protocols that are capable of receiving and transmitting electronic signals such as the signals that would be sent with the system.

Figure 2A:
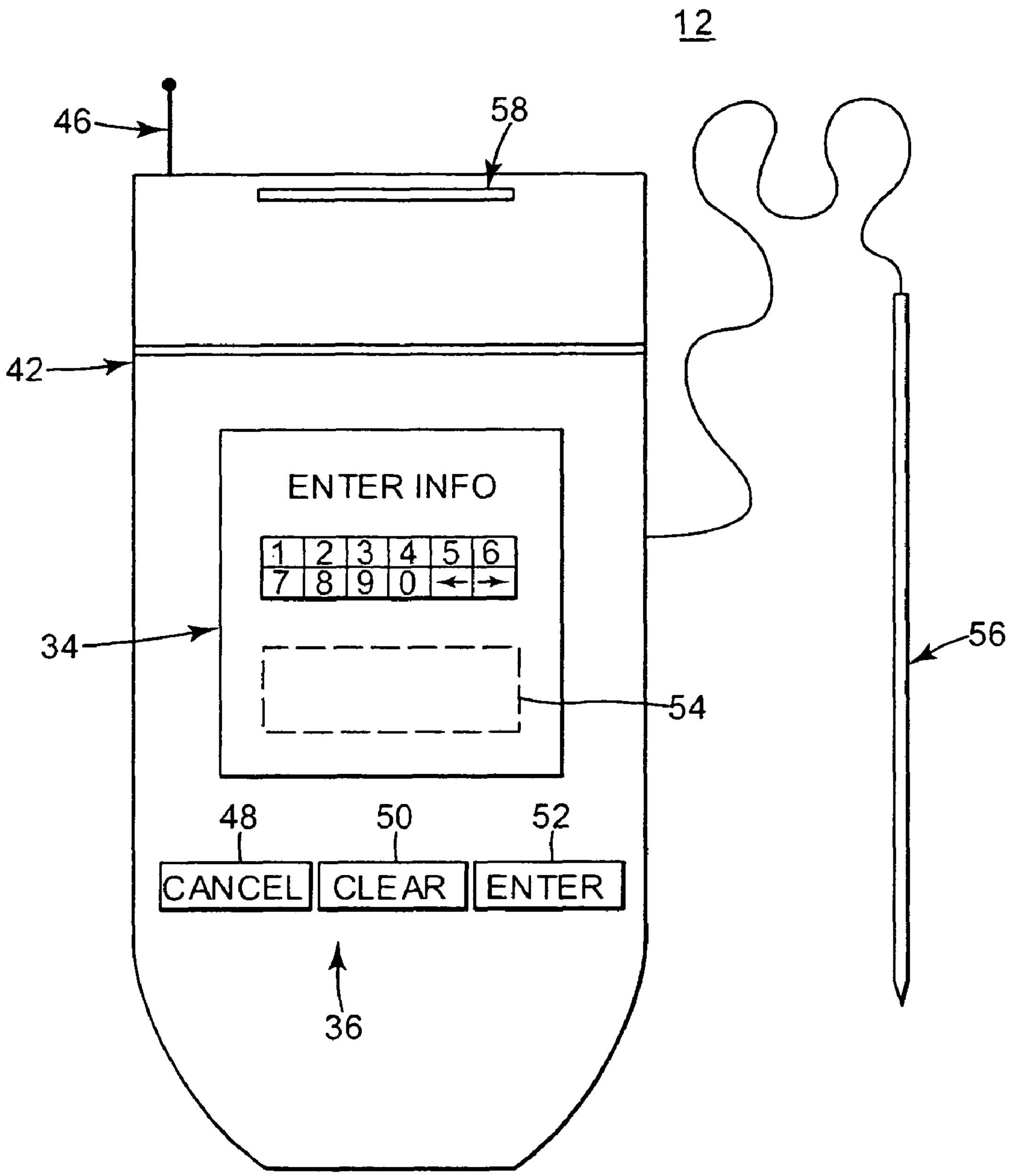
FIG. 2A is a simplified plan view of an embodiment of a portable remote control unit useful with the system(s) and methods of the current invention.
Figure 2B:
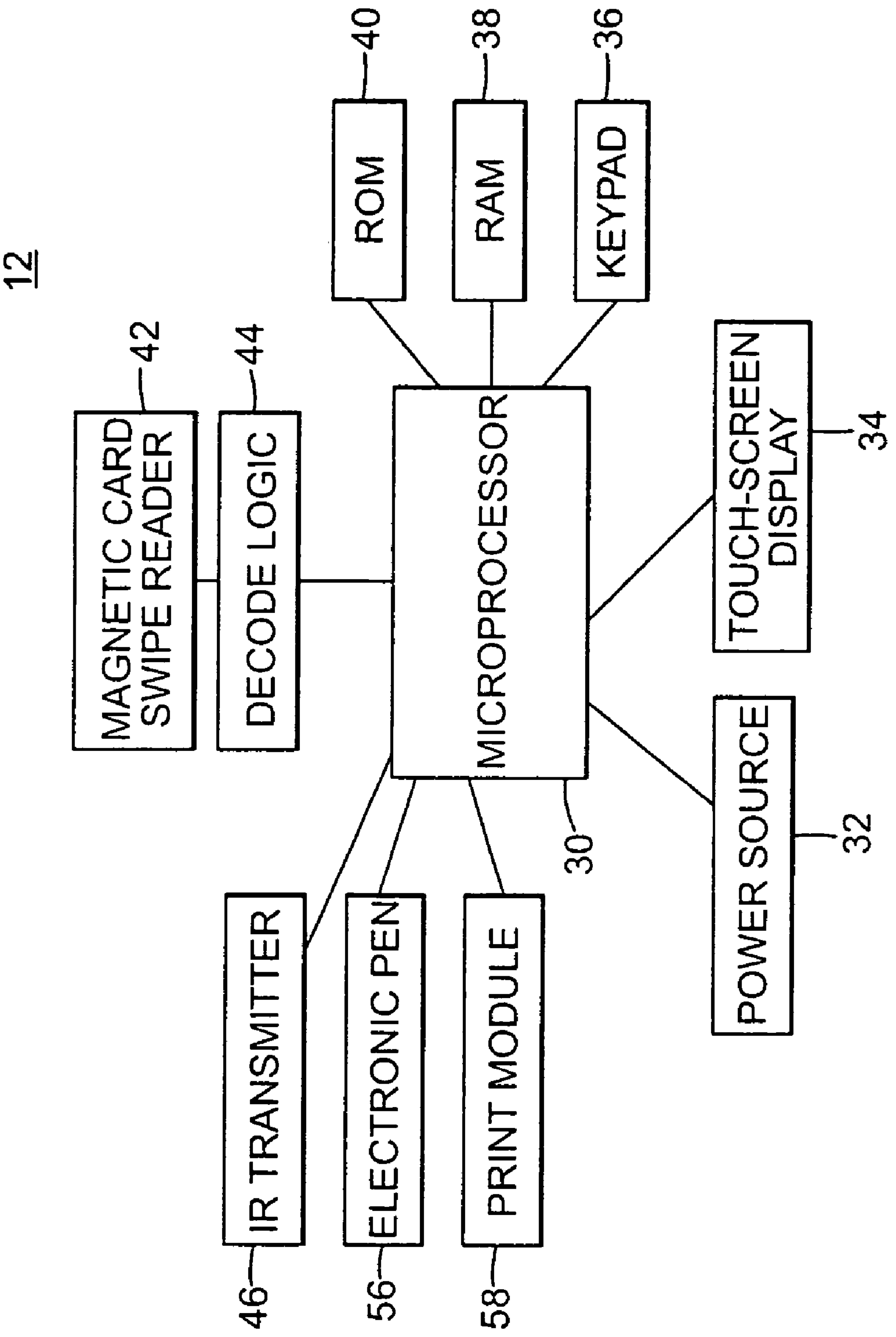
FIG. 2B is a block diagram of the portable remote control unit of FIG. 2A.

One preferred embodiment of the portable RCU 12 is shown in greater detail in FIGS. 2A and 2B. As a point of reference, FIG. 2A provides a top plan view of the RCU 12, whereas the internal components are shown in block form in FIG. 2B. The RCU 12 preferably includes a microprocessor 30, a power source 32, a touch-screen display 34, a keypad 36, RAM 38, ROM 40, a magnetic card swipe reader 42, a decode logic module 44, and an IR transmitter 46. Construction and connection of the various components 30-46 are known in the art, and their interrelationship is described as follows.

The power source 32 is adapted to supply requisite power to other components of the portable RCU 12 (e.g., the microprocessor), and renders the RCU 12 truly portable. Thus, in one preferred embodiment, the power source 12 is a battery, although other types of self-contained power supply devices are acceptable. Alternatively, the RCU 12 can be adapted to be powered by a separate power supply provided within the casino 18 (FIG. 1).

The touch-screen display 34 and the keypad 36 provide a means for interaction between the customer 22 and the RCU 12. For example, the touch-screen display 34 can be operated to display various instructions and selection options to the customer 22 related to a desired financial transaction, with the displayed information/selections changing throughout a transaction operation. The keypad 36 preferably presents "standard" selection options to the customer 22, such as a "cancel" key 48, a "clear" key 50, and a "enter" key 52. The microprocessor 30 is adapted to perform a desired operation in response to depression of one of these keys 48-52. For example, pressing the "cancel" key 48 causes the microprocessor 30 to immediately end a particular transaction operation. The "clear" key 50 prompts the microprocessor 32 to clear previously entered information. Finally, the "enter" key 52 confirms that certain entered information is correct.

The touch-screen display 34 is further preferably formatted to provide a signature-capturing feature. In particular, the touch-screen display 34 in conjunction with the microprocessor 30 is preferably adapted to designate a signature box (shown generally at 54 in FIG. 2A) at a desired time during a financial transaction procedure within which the customer 22 can write his/her signature, such as via an electronic pen 56. The entered signature is electronically stored in an analog or digital format by the microprocessor 30 such as in the RAM 38. Alternatively, other techniques for electronically storing a signature can be incorporated into the RCU 12.

The software used to control operation of the microprocessor 30 is stored in the ROM 40. Conversely, information entered via the touch-screen display 34, the keypad 36, and/or the magnetic card swipe reader 42 is stored by the microprocessor 30 in the RAM 38 for further processing. In particular, the microprocessor 30 formats the data and signals information via the IR transmitter 46.

The magnetic card swipe reader 42 reads and decodes information on a magnetic stripe provided by a financial card (not shown) otherwise swiped through the reader 42. The swipe reader 42 sends information to the decode logic module 44 that converts the serial bit stream from the reader 42 into a byte-wide stream for input to the microprocessor 30. Alternatively, other configurations for converting information provided by a financial card otherwise swiped (or dipped) through the reader 42 can be incorporated.

In one embodiment, the RCU 12 includes a printer module 58 that is otherwise connected to the microprocessor 30. As described in greater detail below, the microprocessor 30 is adapted to operate the printer module 58 to print a transaction receipt or negotiable financial document that in turn is provided to the customer 22 (FIG. 1) upon completion of a financial transaction.

In one embodiment, the RCU 12 is a remote control unit available under the trade designation "ICE 4000" from Hypercom Corporation, of Phoenix, Ariz. Alternatively, other forms are equally acceptable.

Figure 3:
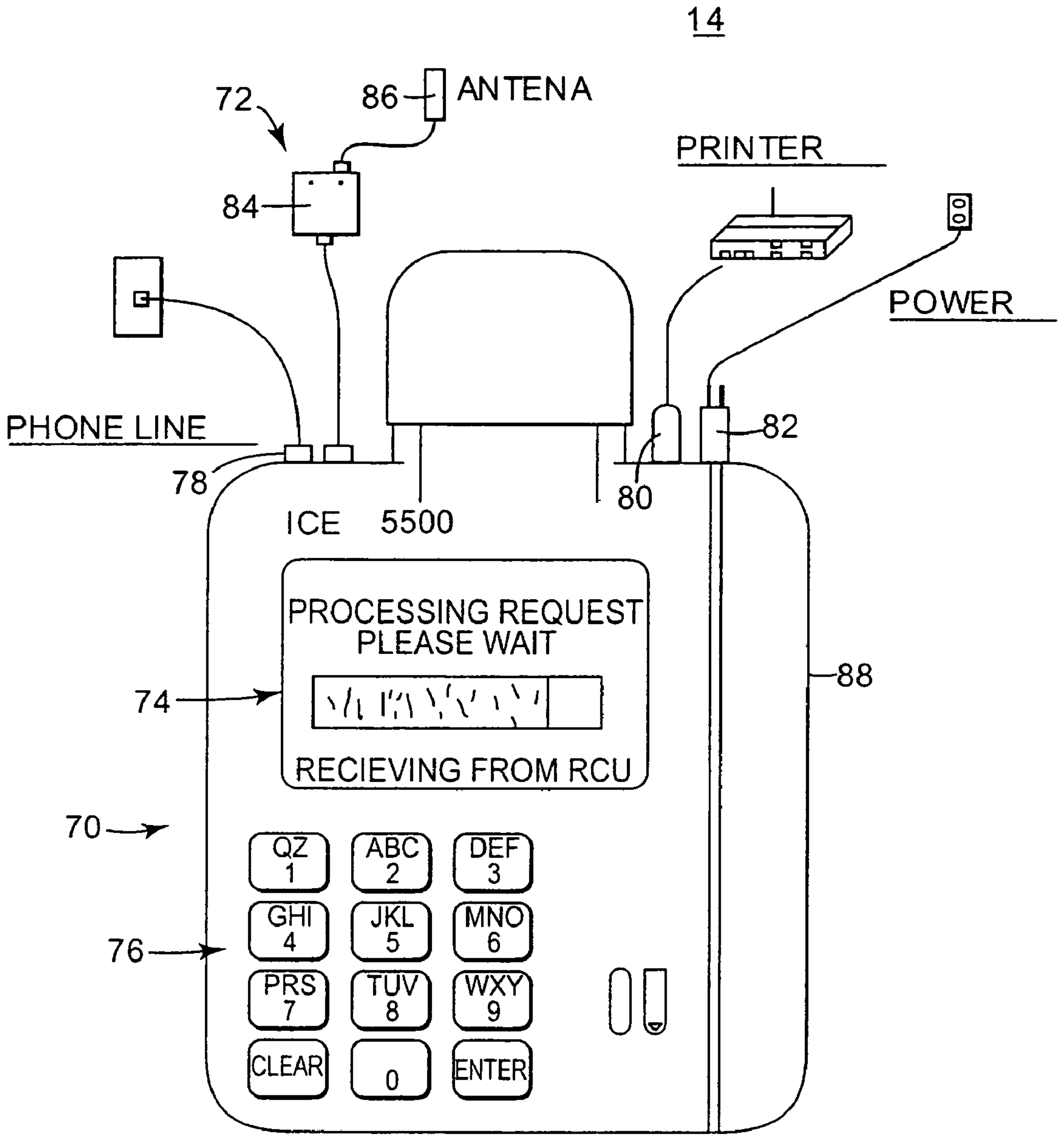
FIG. 3 is a simplified plan view of a base processor useful with the system(s) and methods described above and also useful in connection with the system embodiment of FIG. 1.

One preferred embodiment of the base processor module 14 is provided in FIG. 3. In this regard, the base processor module 14 preferably includes a base processor 70 and a wireless transmitting/receiving device 72. The base processor 70 is a microprocessor-based device, capable of storing information and performing desired operations. In one embodiment, the base processor 70 includes a display screen 74, a keypad 76, a phone line port 78, a printer port 80, and a power supply receptacle 82. In one preferred embodiment, the base processor 70 is a processor device available under the trade designation "ICE 5500" from Hypercom Corporation, of Phoenix, Ariz., although other configurations are equally acceptable. In a further preferred embodiment, the base processor 70 further includes, or has access to, a memory (not shown) in which customer information is stored in a designated database. As described below, this database can be periodically referenced to retrieve previously entered identification information for a repeat user of the system 10.

The display 74 is adapted to inform a user of a particular operational status, whereas the keypad 76 affords the ability to enter desired information.

The transmitting/receiving device 72 is adapted to transmit and receive wireless signaled information to and from the RCU 12 (FIG. 2A) for subsequent processing. In one embodiment, the transmitting/receiving device 72 includes a terminal transceiver 84 and an antenna 86. An appropriate terminal transceiver interface device is available from Hypercom Corporation, of Phoenix, Ariz. Alternatively, the transmitting/receiving device 72 can be incorporated directly into a housing 88 otherwise provided by the base processor 70. Regardless, the transmitting/receiving device 72 is adapted to wirelessly transmit information to, and receive information from, the portable RCU 12.

In order to operate the system 10, the user has an account that is accessible with the system 10. Such an account can include an established or general account managed by a third party, such as a checking account, credit account, other financial services account, or other general account such as one managed by PayPal, or the like. Another type of account can include a specific account that can be established for the purposes of the entertainment activity and used within a particular zone of negotiation, or the like. The zone of negotiation can be limited to a specific geographic location or a set of geographic locations, type of entertainment with the geographic location, limited to a certain set of entertainment activity (such as specified websites for online gaming), limited to a financial amount, or other. In general, the specific account can be operably coupled to one or more of the general accounts so that the user can transfer funds between the specific and general accounts. In addition, the specific account can be used to withdraw or deposit funds related to the entertainment. The specific account can include one or more types of monitoring of account activity that can be accessed through the RCU 12.

The specific account can also include a plurality of sub-accounts. For instance, each family member could be assigned a sub-account based on a specific account assigned to that family. The amounts in each account and limits on transfers, withdrawals, or negotiation zones can be established ahead of time or modified under certain conditions. In addition, deposits or winnings can be spread among the sub-accounts or deposited in certain sub-account(s).

Figure 4A:
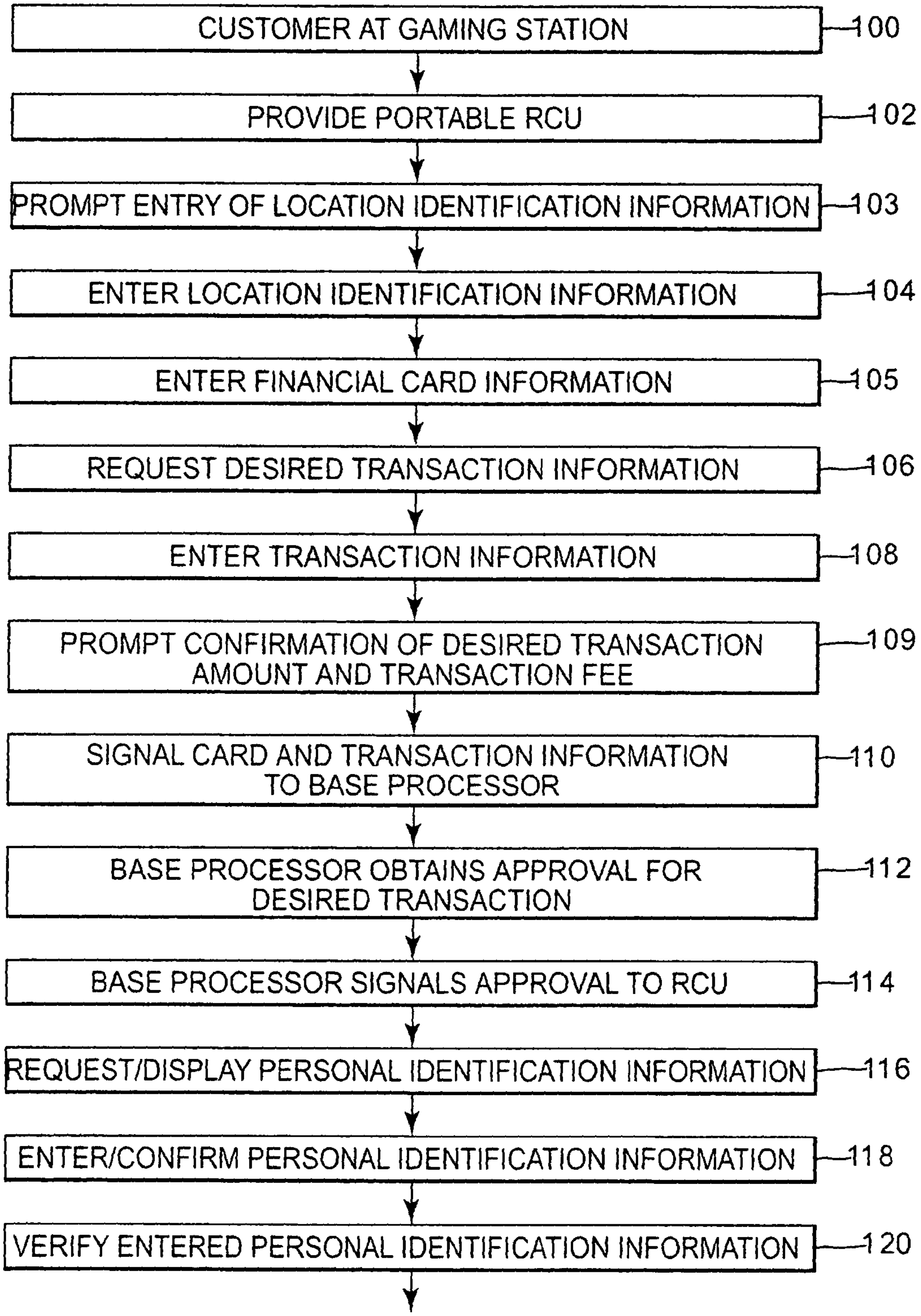
FIGS. 4A-4B is a flow diagram, illustrating one embodiment of a method of performing a casino financial transaction in accordance with the present invention.
Figure 4B:
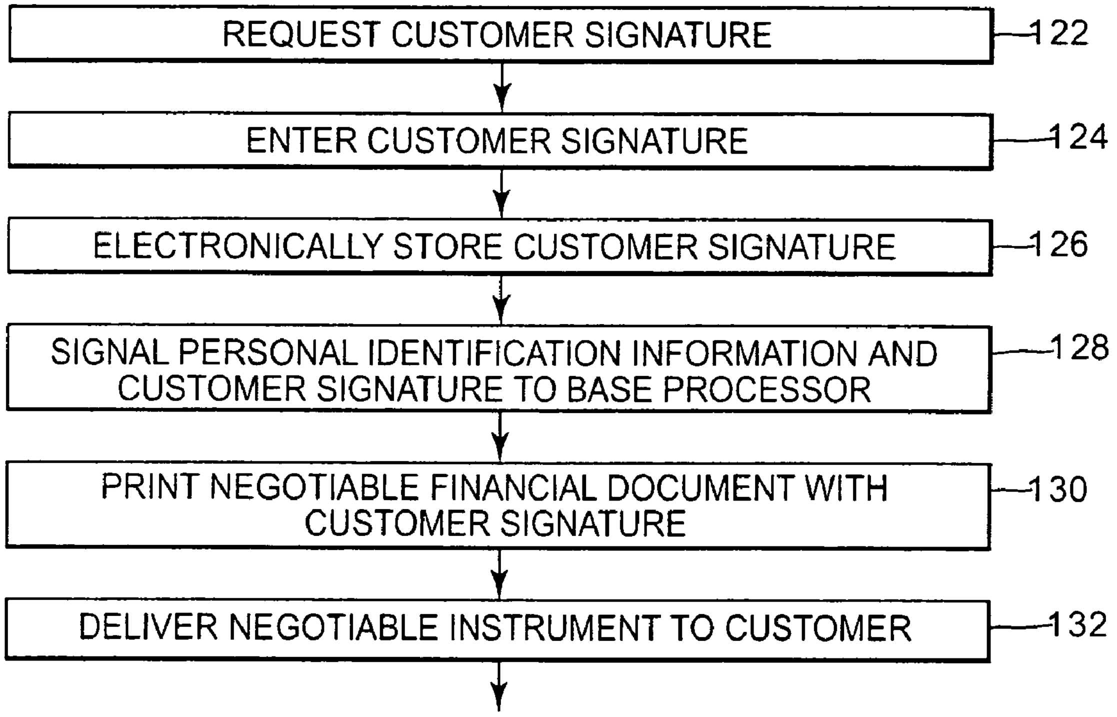

A preferred method of operating the system 10 in accordance with the present invention is provided in flow diagram form in FIGS. 4A and 4B. Beginning at step 100, the customer 22 is located at the gaming station 20 within the casino 18. The gaming station 20 can be one of many entertainment stations, such as gaming machines (e.g., slot machine, a video poker machine, keno machine, etc.) or tables games (e.g., card table, roulette table, craps table, bingo table, etc.) typically found at a casino, or a gaming table.

The embodiments below describe a method of operation where the examples distinguish between a customer and attendants or others. This is only for the sake of illustration. Instead, it is contemplated that a pit boss, dealer, an artificial intelligence system, or other may operate the system on behalf of the entertained or other person. It is also contemplated that two or more persons will operate the system, such as someone on behalf of the entertainer and the entertained.

The customer 22 then desires to obtain cash or other negotiable instrument to continue playing at the gaming station 20. With this in mind, at step 102, the portable RCU 12 is provided to the customer 22 at the gaming station 20. For example, where the gaming station 20 is a card table, the portable RCU 12 can be located on the table itself, or can be stored within arm's reach of an attendant (e.g., dealer, pit boss, etc.) who then provides the portable RCU 12 to the customer 22. Alternatively, casino "runners" are normally dispersed throughout the casino 18 who constantly walk about the casino 18, and are available to assist customers. With this in mind, where the customer 22 is located at a discrete gaming station (e.g., slot machine, video poker, etc.), the runner or other casino personnel can hand deliver the portable RCU 12 to the customer 22. Regardless, the customer 22 is not required to exit or otherwise leave the gaming station 20 to access or interact with the portable RCU 12.

In one preferred embodiment, the RCU 12 then prompts the customer 22 (or casino attendant) to enter location identification information indicative of the particular casino location (or gaming station) at which the RCU 12 and the customer 22 are currently located at step 103. As described in greater detail below, documentation and/or a negotiable instrument may be delivered from a location of the base processor module 14 to the customer 22 upon completion of the financial transaction. To ensure that the document(s) and/or instrument is correctly delivered to the customer 22 (and not to a different customer using a separate RCU), an indication is preferably provided to the base processor module 14 (and thus a casino attendant otherwise responsible for delivering document(s)/instruments from the base processor module 14) of the casino location at which the financial transaction is being performed. The location identification information can assume a wide variety of forms, such as cashier number/designation, table number/designation, gaming machine number/designation, etc. Alternatively, the RCU 12 can be programmed to automatically provide pre-determined location identification information (e.g., where the RCU 12 is permanently located at a specific gaming table, the corresponding table number/designation information can be entered into, and saved by, the RCU 12). Where appropriate, the proper location identification information is entered at step 104. Alternatively, where identifying a specific location of the RCU 12 and/or the customer 22 is of little or no concern, steps 103 and 104 can be omitted.

The customer 22 enters information derived from a financial institution-issued card or other ID card of the customer 22 at step 105. Examples of available ID cards for use with general accounts include credit cards, debit cards, bank cards, or other. As is known, various financial institutions issue cards to their customers that include account information based upon which the customer can utilize to access funds otherwise maintained in that account. The account information can be manually entered by the customer 22 (and/or an attendant) via the touch-screen display 34, or by simply swiping (or dipping) the card through the magnetic card swipe reader 42 (FIG. 2A) or any other optical, smart card, bar code or other identification device.

In the case of a specific account, the form of ID and security can vary and the user is not necessarily tied to a particular card with encoded account information. Instead, acceptable forms of ID can include a biometric ID system (such as a finger print), a drivers license, a room key, a specially issued card from the entertainment facility, or other. The system of linking all authentication and admission systems to a single ID also has the advantage of permitting the player to select their particular security profile. For example, they may wish to use a biometric ID for all of their transactions for extra security. Alternatively, they may prefer to use an ID system that requires a special code that they can then give to others, such as family, friends or associates. In other words, the system permits the management of all IDs in the form and manner that is preferred by the patron or, as the case may be, by the casino or entertainment provider.

It is also contemplated that a general account(s) can be accessed through the customer using an entertainment facility specific ID. In this case, the entertainment specific ID could be used to access a system storing the account information from a bank card, or the like, and the stored information is then transferred to the general account. In one embodiment the system accesses the general account directly. In another embodiment the system access the general account through the specific account, and all funds from the general account(s) are provided first into the specific account rather than directly to the user. The latter approach also permits the control of spending or usage across any number of financial accounts or access devices. For example, if a person has a problem with gambling, they may wish to apply a spending cap on their card. With multiple accounts and credit cards, however, most prior art systems would only be equipped to monitor that financial activities of a single card and stop excess spending. This is an inferior management process if the user is likely to use alternate cards to access more Cash than they would otherwise be permitted to spend. The system of the present invention improves upon such monitoring and compliance systems.

The RCU 12 then prompts the customer 22 to enter transaction information (transaction desired, account selected-if several accounts are linked to the ID, and other information as set forth above) into the RCU 12 at step 106. In particular, the customer 22 is requested to enter a desired amount of the proposed financial transaction. At step 108, the customer 22 provides the transaction information to the RCU 12, such as by the touch-screen display 34.

After the transaction is entered and confirmed, the RCU 12 will send a communication signal regarding the received transaction information to the base processor 14. The communication signal can include a card aspect and a transaction information aspect provided to the base processor as shown at step 110. The base processor 14 obtains approval for the transaction based on the received communication signal, 112. The base processor module 14 can include all the necessary components and information stored in its memory to perform the approval, or the base processor module can access any necessary information or components over a network. If the transaction is not approved, the base processor 14 will provide a signal RCU 12 causing it to inform to the customer 22 that the transaction has been declined. If the transaction is approved, the base processor provides a communication signal to the RCU 12, such as at step 114 instructing it to inform the customer 22 that the transaction has been approved, such as by requesting the customer 22 to provide information for the next step, or to simply request the customer to stand by.

Approval of a transaction can be based on a variety of criteria. At a basic form, the approval is based on the user correctly identifying the account and having the requested funds available in the account. Additional criteria can be included. For example, approval can also be based on whether the user has reached a particular spending limit per given amount of time or per entertainment station, the particular type of entertainment station, time of day, level of intoxication, or other criteria. In one example, these additional criteria are considered at the base processor 14 as part of the method. In other examples, one or more of these additional criteria can be considered by the attendant who can include an approval code to the RCU 12 in order to facilitate approval of the transaction. The remaining steps of this example process are performed in certain circumstances after the transaction has been approved.

In one example, the system 10 can require additional person identification information to complete the approved transaction. The system 10 requests (or displays) personal identification information with the RCU 12 in step 116. For example, if the system did not request a personal identification number from the customer that is associated with the card prior to approval of the transaction, the system can perform that step now. Also, the system can request an additional form of identification, such as a drivers license card, a finger print, or other type of identification. The customer 22 enters the personal identification information at step 118, and can verify the personal identification information at the RCU 12 at step 120. In the case where the personal identification information is already entered into the system, the RCU 12 can display the personal identification information to the customer and then request that the customer confirm the personal identification information, in steps 116 and 118.

In one example, the system 10 at the RCU 12 can request a signature from the customer in order to complete the transaction. The RCU 12 prompts the customer to provide the signature, 122. The customer can enter the signature, at step 124, with the electronic pen 56 onto the signature block 54 designated on the touch screen display 34. The system can store the customer signature at the RCU 12, the base processor 14 or on a network, step 126. The RCU 12 can provide a communication signal to the base processor 14 containing an aspect related to the entered or confirmed personal identification information and/or the customer signature at step 128. This information can be processed and approved in a manner similar to steps 110-114 above.

Once the transaction information has been received and approved, the system completes the transaction. The system can deposit funds into the designated customer account, transfers funds between accounts, or the like. Also, the entertainment device or associated dealer or pit boss can provide the player with another form of negotiable financial instrument (electronic credit, chips, tickets, cards, other ID) or perform another requested financial transactions by either transmitting one or more electronic signals to another system OR encoding data into a portable electronic medium such as paper (with bar codes, hex, alphanumeric, etc), digital memory (memory sticks, USB drives, jump drives, wireless devices) or other portable communications device. In another example, the system provides cash or chips to the customer. In still another example, the base processor prepares the printer 16 to print out a negotiable financial document, such as a check, at step 130. The negotiable financial document is then delivered to the customer 132.

The system 10 can also provide for the task of ticket redemption transactions. The ticket includes encoded data, such as a barcode, which is read by the system 10 as the ticket is introduced. The ticket may be introduced by a number of methods, such as swiping it through a ticket reader on the RCU 12. The encoded data on the ticket is electronically processed by the system 10 to retrieve the information represented by the data. The system can also validate the ticket. The unique identifier could be verified against a redemption ticket database, which indicates whether the ticket has been previously redeemed. The redemption ticket database could also store multiple identifiers and associates each identifier with a predetermined dollar value based on players' winnings at various gaming machines. Once the redemption ticket database determines the predetermined dollar value associated with the specific identifier on the player's ticket, the dollar value is returned to the system 10.

It should be noted that these are merely proposed system and method embodiments that can be used to implement the innovations above. Different financial systems and remote financial units could also be used. Indeed, given the speed of innovation in communications technology and in particular wireless protocols, it is fully expected that new and improved communications and interface systems will be developed and used with these inventions.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. A cash access system for use by an entertainment station customer within an entertainment environment, the cash access system comprising:

a user-controlled remote control unit adapted for customer performance of a cash access transaction proximate to an entertainment station, the remote control unit comprising a portable unit having a self-contained processor, a power supply, and a user interface operable by the customer, the remote control unit being physically separate from the entertainment station and being configured to perform the cash access transaction at multiple locations within the entertainment environment, and the remote control unit provided to the customer by a entertainment station provider or an agent thereof; and a base processor adapted to communicate with the remote control unit, the base processor configured to conduct a withdrawal from one or more external financial accounts, the withdrawal obtaining funds used in connection with the cash access transaction;

wherein the remote control unit is adapted to receive customer commands within the user interface of the remote control, the customer commands including requesting the cash access transaction, receiving customer financial account information of the one or more external financial accounts, and receiving a customer signature, and wherein the remote control unit is further adapted to transmit a communication signal to the base processor, the communication signal including data representing the customer signature and the customer financial account information;

wherein the base processor is adapted to receive the communication signal from the remote control unit, process the customer financial account information, store the customer signature, request the funds from the one or more external financial accounts using the customer financial account information, and provide approval for physical distribution of at least one of cash or cash equivalent to the customer;

wherein the cash access transaction is conducted independent of game play at the entertainment station, and wherein responsive to the base processor providing approval of the physical distribution of the at least one of cash or cash equivalent, the entertainment station provider or an agent thereof physically provides the physical distribution of the at least one of cash or cash equivalent to the customer at a location of the remote control unit.

2. The cash access system of claim 1, wherein the cash or cash equivalent is cash including at least one of coins and bills.

3. The cash access system of claim 1, wherein the cash or cash equivalent is cash equivalent including at least one of chips, checks, and tickets.

4. The cash access system of claim 1, wherein the withdrawal conducted in connection with the cash access transaction is selected from the group consisting of an ATM card cash withdrawal, a Point of Sale (POS) debit card cash withdrawal, and a credit card cash advance.

5. The cash access system of claim 1, wherein the remote control unit includes a reader to read at least one form of identification of the user, and wherein the base processor is adapted to verify the identification of the user before performing the withdrawal.

6. The cash access system of claim 5, wherein the identification card is a state-issued driver license.

7. The cash access system of claim 1, wherein the reader includes a magnetic card reader.

8. The cash access system of claim 7, wherein the magnetic card reader is adapted to receive a magnetic card having encoded financial account information.

9. The cash access system of claim 1, wherein the entertainment station includes at least one of a gaming table and a gaming machine.

10. The cash access system of claim 1, wherein the remote control unit is physically coupled to the entertainment station.

11. The cash access system of claim 1, wherein the base processor is operably coupled to a printer.

12. The cash access system of claim 1, wherein the remote control unit communicates with the base processor with a wireless communication signal.

13. The cash access system of claim 1, wherein the remote control unit is further adapted to provide location identification information indicative of a location of the remote control unit to the base processor during performance of the requested transaction type.

14. A cash access system configured to facilitate cash access transactions initiated by customers at a gaming station location, comprising:

a remote control unit, the remote control unit being adapted for customer performance of a cash access transaction at the gaming station, the remote control unit comprising a portable unit having a self-contained processor, a power supply, and a user interface operable by the customer, wherein the remote control unit is provided to the customer by a gaming station provider or an agent thereof, and wherein the remote control unit is further configured for coupling to the gaming station; and a base processor, the base processor being adapted to communicate with the remote control unit, the base processor configured to conduct a withdrawal from one or more external financial accounts, the withdrawal obtaining funds used in connection with the cash access transaction;

wherein the remote control unit is adapted to receive customer commands within the user interface of the remote control, the customer commands including requesting the cash access transaction, receiving customer financial account information of the one or more external financial accounts, and receiving a customer signature, and wherein the remote control unit is further adapted to transmit a communication signal to the base processor, the communication signal including data representing the customer signature and the customer financial account information;

wherein the base processor is adapted to receive the communication signal from the remote control unit, process the customer financial account information, store the customer signature, request the funds from the one or more external financial accounts using the customer financial account information, and provide approval for physical distribution of at least one of cash or cash equivalent to the customer; and wherein the cash access transaction is conducted independent of game play at the gaming station, and wherein responsive to the base processor providing approval of the physical distribution of the at least one of cash or cash equivalent, the gaming station provider or an agent thereof physically delivers the physical distribution of the at least one of cash or cash equivalent to the customer at the gaming station location.

15. The entertainment station of claim 14, wherein the remote control unit is physically integrated into the gaming station.

16. The entertainment station of claim 14, wherein the remote control unit is electronically coupled to the base processor.

17. The entertainment station of claim 14, wherein the gaming station is a gaming table including at least one of a card table, roulette table, craps table and bingo table.

18. The entertainment station of claim 14, wherein the gaming station is a gaming machine including at least one of a slot machine, video poker machine, and keno machine.

19. The entertainment station of claim 14, wherein the financial account information is directly provided as an input to the remote control device.

20. The entertainment station of claim 14, wherein at least one of the external financial accounts is a specific account allowing cash access transactions in connection with an entertainment activity used within a particular zone of negotiation.

21. The entertainment station of claim 20, wherein the zone of negotiation includes a set of at least one geographic location, a type of entertainment within a selected geographic location, a set of at least one entertainment activity, and a limited financial amount.

22. A method for remote customer operation of a cash access transaction proximate to an entertainment station, including:

providing a remote control unit to a customer for remote performance of a cash access transaction within an entertainment environment;

receiving commands for the cash access transaction from an entertainment station customer into the remote control unit, the cash access transaction commands including a request of the cash access transaction, receipt of customer financial account information for one or more external financial accounts, and receipt of a customer signature, the remote control unit comprising:

a portable unit having a self-contained processor, a power supply, and a user interface operable by the customer to receive the cash access transaction commands, wherein the remote control unit is physically separate from the entertainment station but located proximate to the entertainment station;

sending electronic data containing the customer financial account information to a base processor remotely located from the remote control unit and the entertainment station, the electronic data including the cash access transaction commands, the base processor configured to request a withdrawal from the one or more external financial accounts, the withdrawal used to obtain funds used in connection with the cash access transaction;

obtaining approval to conduct the withdrawal from the one or more external financial accounts based on at least correctly identifying the one or more external financial accounts and having funds available in the one or more external financial accounts; and providing the physical distribution of the at least one of cash or cash equivalent to the customer at a location of the customer within the entertainment environment.

23. The method of claim 22, wherein obtaining approval to conduct the withdrawal further includes at least one of considering: whether the user has reached a particular spending limit, the entertainment station, and time of day.

24. A cash access system for use by an entertainment station customer within an entertainment environment, the cash access system comprising:

a user-controlled remote control unit adapted for customer performance of a cash withdrawal transaction proximate to an entertainment station, the remote control unit comprising a portable unit having a self-contained processor, a power supply, and a user interface operable by the customer, the remote control unit being physically separate from the entertainment station and being configured to perform the cash access transaction at multiple locations within the entertainment environment; and a base processor adapted to communicate with the remote control unit, the base processor configured to conduct a cash withdrawal transaction from one or more external financial accounts, the withdrawal obtaining funds for a physical distribution of one or more of coins and bills from the cash withdrawal transaction;

wherein the remote control unit is adapted to receive customer commands within the user interface of the remote control, the customer commands including requesting the cash access transaction, receiving customer financial account information of the one or more external financial accounts, and receiving a customer signature, and wherein the remote control unit is further adapted to transmit a communication signal to the base processor, the communication signal including data representing the customer signature and the customer financial account information;

wherein the base processor is adapted to receive the communication signal from the remote control unit, process the customer financial account information, store the customer signature, request the funds from the one or more external financial accounts using the customer financial account information, and provide approval for the physical distribution of the one or more of coins and bills to the customer;

wherein responsive to the base processor providing approval of the physical distribution of the one or more of coins and bills, the entertainment station provider or an agent thereof physically provides the physical distribution of the one or more of coins and bills to the customer at a location of the remote control unit;

wherein the cash withdrawal transaction comprises an ATM card cash withdrawal, a Point of Sale (POS) debit card cash withdrawal, or a credit card cash advance conducted upon the one or more external financial accounts.

* * * * *